(12) United States Patent
Nakanoya et al.

(10) Patent No.: US 10,252,331 B2
(45) Date of Patent: *Apr. 9, 2019

(54) SILVER POWDER, METHOD FOR PRODUCING SAME, AND CONDUCTIVE PASTE

(71) Applicant: DOWA Electronics Materials Co., Ltd., Tokyo (JP)

(72) Inventors: Taro Nakanoya, Tokyo (JP); Hiroshi Kamiga, Tokyo (JP)

(73) Assignee: DOWA Electronics Materials Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/500,152

(22) PCT Filed: Jul. 27, 2015

(86) PCT No.: PCT/JP2015/071293
§ 371 (c)(1),
(2) Date: Jan. 30, 2017

(87) PCT Pub. No.: WO2016/017600
PCT Pub. Date: Feb. 4, 2016

(65) Prior Publication Data
US 2017/0259333 A1    Sep. 14, 2017

(30) Foreign Application Priority Data

Jul. 31, 2014  (JP) .................................. 2014-156460
Jul. 24, 2015  (JP) .................................. 2015-146622

(51) Int. Cl.
| | |
|---|---|
| H01B 1/22 | (2006.01) |
| B22F 1/00 | (2006.01) |
| B22F 9/24 | (2006.01) |
| C09C 3/08 | (2006.01) |
| C09C 3/06 | (2006.01) |
| C09C 3/10 | (2006.01) |
| C09C 1/62 | (2006.01) |
| H01B 5/00 | (2006.01) |

(52) U.S. Cl.
CPC .......... B22F 1/0062 (2013.01); B22F 1/0014 (2013.01); B22F 9/24 (2013.01); C09C 1/62 (2013.01); C09C 3/06 (2013.01); C09C 3/08 (2013.01); C09C 3/10 (2013.01); H01B 1/22 (2013.01); H01B 5/002 (2013.01); *B22F 2009/245* (2013.01); *B22F 2301/255* (2013.01); *B22F 2304/10* (2013.01); *B22F 2998/10* (2013.01); *C01P 2004/51* (2013.01); *C01P 2006/12* (2013.01)

(58) Field of Classification Search
CPC ........ B22F 1/0062; B22F 1/0014; B22F 9/24; C09C 3/08; C09C 3/06; C09C 3/10; C09C 1/62; H01B 1/22; H01B 5/002

USPC ......................................................... 252/514
See application file for complete search history.

(56) References Cited

U.S. PATENT DOCUMENTS

| | | | |
|---|---|---|---|
| 4,443,495 A * | 4/1984 | Morgan ................. | C08G 75/02 252/502 |
| 5,158,708 A | 10/1992 | Yamamoto et al. | |
| 8,053,066 B2 * | 11/2011 | Yamakawa ............... | H01B 1/16 252/512 |
| 2006/0063089 A1 | 3/2006 | Tanaka et al. | |
| 2009/0042001 A1* | 2/2009 | Yamakawa ............... | H01B 1/16 428/220 |
| 2009/0098396 A1* | 4/2009 | Chasser ................... | C08J 3/203 428/457 |
| 2009/0116998 A1 | 5/2009 | Fujimoto et al. | |
| 2011/0253949 A1 | 10/2011 | Kaneda et al. | |
| 2012/0048426 A1 | 3/2012 | Ishizaki | |
| 2012/0064291 A1* | 3/2012 | Lai ....................... | H01L 23/5328 428/141 |
| 2013/0234078 A1 | 9/2013 | Saito et al. | |
| 2014/0196772 A1 | 7/2014 | Irizarry-Rivera et al. | |
| 2014/0218163 A1* | 8/2014 | Zaffaroni ................. | C08K 3/04 338/322 |

(Continued)

FOREIGN PATENT DOCUMENTS

| | | |
|---|---|---|
| CN | 102054882 A | 5/2011 |
| JP | 03-022306 A | 6/1989 |

(Continued)

OTHER PUBLICATIONS

Machine translation of JP 2005042174A, Feb. 17, 2005.*

(Continued)

*Primary Examiner* — Douglas J McGinty

(74) *Attorney, Agent, or Firm* — Carmody Torrance Sandak & Hennessey LLP

(57) ABSTRACT

A silver powder, including: an organic substance on a surface of the silver powder, the organic substance containing at least one carboxyl group and at least one hydroxyl group in one molecule of the organic substance, wherein a ratio of (Casson yield value/BET specific surface area) is 500 or less, where the Casson yield value is a Casson yield value of a conductive paste and the BET specific surface area is a BET specific surface area of the silver powder, where the conductive paste has a composition in which the silver powder is 86% by mass, a glass fit is 1% by mass, ethyl cellulose is 0.6% by mass, texanol is 10.5% by mass, and zinc oxide is 1.9% by mass, and the conductive paste is prepared by kneading the composition with a planetary centrifugal stirrer and bubble remover and dispersing with a triple roll mill.

13 Claims, 1 Drawing Sheet

(56) References Cited

U.S. PATENT DOCUMENTS

| | | | | |
|---|---|---|---|---|
| 2015/0137347 | A1* | 5/2015 | Nakako | C09J 1/00 |
| | | | | 257/734 |
| 2015/0368388 | A1* | 12/2015 | Kurata | C08F 255/08 |
| | | | | 522/33 |
| 2017/0206998 | A1* | 7/2017 | Michiaki | H01B 1/22 |
| 2017/0259333 | A1 | 9/2017 | Nakanoya et al. | |
| 2017/0259334 | A1* | 9/2017 | Nakanoya | B22F 1/0062 |
| 2018/0001388 | A9* | 1/2018 | Akimoto | B22F 9/14 |
| 2018/0057632 | A1* | 3/2018 | Sato | C08G 59/58 |

FOREIGN PATENT DOCUMENTS

| | | |
|---|---|---|
| JP | 08-176620 | 7/1996 |
| JP | 11-317112 | 11/1999 |
| JP | 2003-262949 | 9/2003 |
| JP | 2005-042174 | 2/2005 |
| JP | 2008-223096 | 9/2008 |
| JP | 2010-229544 | 10/2010 |
| JP | 2011-032509 | 2/2011 |
| JP | 2011-052300 | 3/2011 |
| JP | 2012-214873 | 11/2012 |
| JP | 2013-151753 | 8/2013 |
| JP | 2013151753 | 8/2013 |
| JP | 2015-010256 | 1/2015 |

OTHER PUBLICATIONS

Korean Intellectual Property Office, Korean Office Action for corresponding Korean Application No. 10-2017-7005591, dated Dec. 12, 2017.
The Patent Office of the People's Republic of China, Chinese Office Action for corresponding Chinese Application No. 201580041792. X, dated Feb. 5, 2018.

* cited by examiner

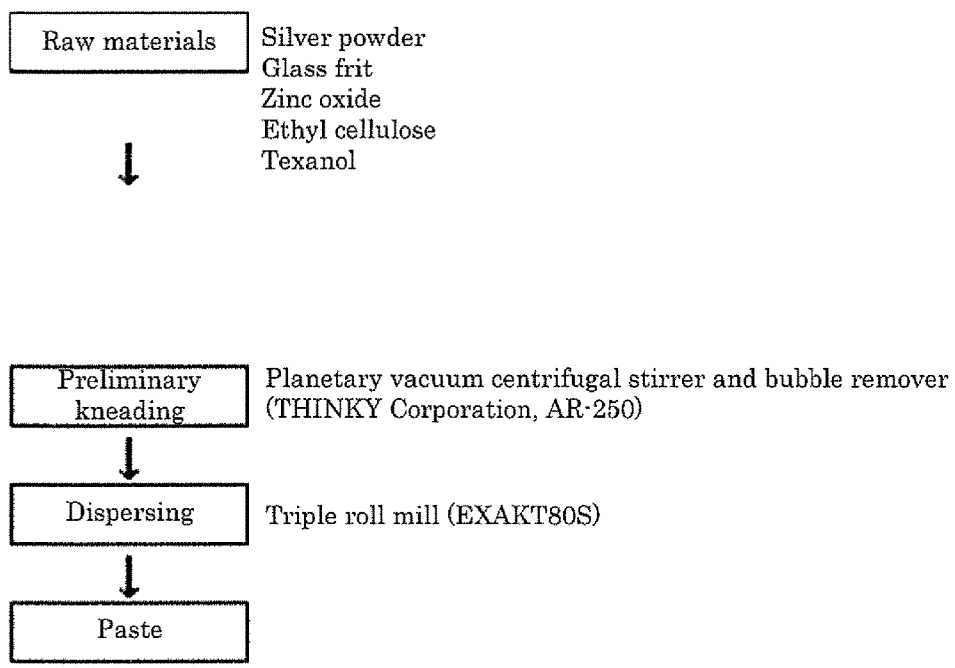

SILVER POWDER, METHOD FOR PRODUCING SAME, AND CONDUCTIVE PASTE

TECHNICAL FIELD

The present invention relates to: a silver powder used in a conductive paste used for formation of, for example, inner electrodes of laminated condensers and circuits of solar cells, plasma display panels, and touch panels; a method for producing the silver powder; and a conductive paste.

BACKGROUND ART

One conventionally widely used method for forming, for example, inner electrodes of laminated condensers, conductive patterns of circuit boards, and electrodes and circuits of substrates for solar cells and plasma display panels is a method including: adding a silver powder to an organic vehicle together with a glass frit, followed by kneading, to thereby produce a conductive paste of a burning type; forming the produced conductive paste on a substrate in a predetermined pattern; and heating the resultant at a temperature of 500° C. or higher to remove organic components and sinter the silver powder particles together, to thereby form a conductive film.

Conductive pastes used for such applications are required to respond to, for example, higher densification and finer lines of conductive patterns in order to achieve downsizing of electronic parts. Therefore, silver powders used are required, for example, to have appropriately small particle diameters and uniform particle sizes and to be dispersed in an organic vehicle.

A known method for producing a silver powder for such a conductive paste is a wet reduction method of adding a reducing agent to an aqueous reaction system containing silver ions to deposit spherical silver powder through reduction (see, for example, PTL 1).

Another known method is a method of adsorbing a dispersion agent on surfaces of particles after deposition of the particles through reduction in order to improve compatibility with an organic vehicle in a wet reduction method (see, for example, PTL 2).

CITATION LIST

Patent Literature

PTL 1: Japanese Patent Application Laid-Open (JP-A) No. 08-176620
PTL 2: JP-A No. 2013-151753

SUMMARY OF INVENTION

Technical Problem

As described above, accompanied with downsizing of electronic parts, conductive pastes capable of drawing fine wired lines have been demanded. In screen printing, serious technical problems such as the opening size of a mesh arise when fine wired lines are drawn. Therefore, currently, a technique of forming wired lines using a photosensitive paste has attracted attention.

When the photosensitive paste is used, the levelling property of the photosensitive paste becomes a very important property. Use of a photosensitive paste having a poor levelling property causes unevenness in the thickness of the resultant conductive film, raising problems such as insufficient curing of the conductive film.

In view of such problems, the present invention aims to provide: a silver powder capable of producing a conductive paste having a good levelling property; a method for producing the silver paste; and a conductive paste.

Solution to Problem

The present inventor conducted extensive studies to solve the above problems and as a result has found that the above problems can be effectively solved by using a silver powder including: an organic substance on a surface of the silver powder, the organic substance containing at least one carboxyl group and at least one hydroxyl group in one molecule of the organic substance, wherein a ratio of (Casson yield value/BET specific surface area) is 500 or less, where the Casson yield value is a Casson yield value of a conductive paste and the BET specific surface area is a BET specific surface area of the silver powder. Note that, the composition of the conductive paste is that the silver powder is 86% by mass, a glass frit is 1% by mass, ethyl cellulose is 0.6% by mass, texanol is 10.5% by mass, and zinc oxide is 1.9% by mass. The conductive paste is prepared by kneading the composition with a planetary centrifugal stirrer and bubble remover and dispersing with a triple roll mill.

The present invention is based on the above finding obtained by the present inventor and means for solving the problems are as follows.

<1> A silver powder, including:

an organic substance on a surface of the silver powder, the organic substance containing at least one carboxyl group and at least one hydroxyl group in one molecule of the organic substance, wherein a ratio of (Casson yield value/BET specific surface area) is 500 or less, where the Casson yield value is a Casson yield value of a conductive paste and the BET specific surface area is a BET specific surface area of the silver powder, where the conductive paste has a composition in which the silver powder is 86% by mass, a glass fit is 1% by mass, ethyl cellulose is 0.6% by mass, texanol is 10.5% by mass, and zinc oxide is 1.9% by mass, and the conductive paste is prepared by kneading the composition with a planetary centrifugal stirrer and bubble remover and dispersing with a triple roll mill.

<2> The silver powder according to <1>, wherein the organic substance is a fatty acid containing at least one hydroxyl group in one molecule of the fatty acid.

<3> The silver powder according to <2>, wherein the number of carbon atoms in one molecule of the fatty acid is 6 or more but 20 or less.

<4> The silver powder according to <2> or <3>, wherein the fatty acid is at least one selected from the group consisting of ricinoleic acid, 12-hydroxystearic acid, and aleuritic acid.

<5> The silver powder according to any one of <1> to <4>, wherein the BET specific surface area of the silver powder is 0.1 m$^2$/g or more but 2.0 m$^2$/g or less and wherein a cumulative 50% point of particle diameter (Du) of the silver powder in a volume-based particle size distribution of the silver powder as measured by a laser diffraction particle size distribution analysis is 0.1 μm or more but 6.0 μm or less, and a ratio of [(D$_{90}$−D$_{10}$)/D$_{50}$] is 3.0 or less, where D$_{50}$ is the cumulative 50% point of particle diameter, D$_{90}$ is a cumulative 90% point of particle diameter of the silver powder, and D$_{10}$ is a cumulative 10% point of particle diameter of the silver powder.

<6> A method for producing a silver powder, the method including:
reducing and depositing a silver powder with a reducing agent by a wet reduction method and then adding an organic substance as a dispersion agent, the organic substance containing at least one carboxyl group and at least one hydroxyl group in one molecule of the organic substance.

<7> The method for producing a silver powder according to <6>, wherein the reducing agent is at least one selected from the group consisting of ascorbic acid, alkanolamine, sodium borohydride, hydroquinone, hydrazine, and formalin.

<8> A conductive paste, including:
the silver powder according to any one of <1> to <5>.

<9> The conductive paste according to <8>, wherein the conductive paste is a photosensitive paste.

<10> A conductive paste, including:
a silver powder containing an organic substance on a surface of the silver powder, the organic substance containing at least one carboxyl group and at least one hydroxyl group in one molecule of the organic substance;
a glass frit;
a resin; and
a solvent,
wherein a ratio of (Casson yield value/BET specific surface area) is 500 or less, where the Casson yield value is a Casson yield value of the conductive paste and the BET specific surface area is a BET specific surface area of the silver powder.

<11> The conductive paste according to <10>, wherein the organic substance is a fatty acid containing at least one hydroxyl group in one molecule of the fatty acid, and the number of carbon atoms in one molecule of the fatty acid is 6 or more but 20 or less.

<12> The conductive paste according to <11>, wherein the fatty acid is at least one selected from the group consisting of ricinoleic acid, 12-hydroxystearic acid, and aleuritic acid.

<13> The conductive paste according to any one of <8> to <12>, wherein the BET specific surface area of the silver powder is 0.1 m$^2$/g or more but 2.0 m$^2$/g or less and wherein a cumulative 50% point of particle diameter ($D_{50}$) of the silver powder in a volume-based particle size distribution of the silver powder as measured by a laser diffraction particle size distribution analysis is 0.1 μm or more but 6.0 μm or less, and a ratio of $[(D_{90}-D_{10})/D_{50}]$ is 3.0 or less, where $D_{50}$ is the cumulative 50% point of particle diameter, $D_{90}$ is a cumulative 90% point of particle diameter of the silver powder, and $D_{10}$ is a cumulative 10% point of particle diameter of the silver powder.

Advantageous Effects of Invention

The present invention can solve the above various problems in the art and can provide: a silver powder capable of producing a conductive paste having a good levelling property; a method for producing the silver paste; and a conductive paste.

BRIEF DESCRIPTION OF THE DRAWINGS

FIG. 1. Depicts a flow chart of the preparation flow of the conductive paste in accordance with the present invention.

DESCRIPTION OF EMBODIMENTS (Silver Powder)
A silver powder of the present invention contains an organic substance on a surface of the silver powder, the organic substance containing at least one carboxyl group and at least one hydroxyl group in one molecule of the organic substance, wherein a ratio of (Casson yield value/BET specific surface area) is 500 or less, where the Casson yield value is a Casson yield value of a conductive paste and the BET specific surface area is a BET specific surface area of the silver powder, where the conductive paste has a composition in which the silver powder is 86% by mass, a glass frit is 1% by mass, ethyl cellulose is 0.6% by mass, texanol is 10.5% by mass, and zinc oxide is 1.9% by mass, and the conductive paste is prepared by kneading the composition with a planetary centrifugal stirrer and bubble remover and dispersing with a triple roll mill.

<Casson Yield Value>
The Casson yield value (τ0) can be calculated from the following formula (A), which is obtained from a scatter chart of √τ and √D, where τ is shear stress and D is shear velocity.

$$\sqrt{\tau}=a\times\sqrt{D}+\sqrt{\tau 0} \tag{A}$$

The shear stress τ can be calculated from the following formula (B) using viscosity (η) and shear velocity (D).

$$\tau=\eta\times D \tag{B}$$

The viscosity is defined as a value measured at 25° C. using cone: CP52 in viscometer 5XHBDV-IIIUC manufactured by BROOKFIELD Co. Note that, in the cone: CP52, the angle of the cone is 3°.

The shear velocity D is a value that can be obtained from the angular velocity (ω) of the cone and the angle (θ) of the cone. The shear velocity D can be calculated from the following formula (C).

$$D=\omega/\sin\theta \tag{C}$$

When the Casson yield value is too large, the conductive paste becomes poor in levelling property. Thus, the Casson yield value is preferably 600 or less, more preferably 500 or less.

—BET Specific Surface Area of Silver Powder—
A BET specific surface area of the silver powder can be measured with Macsorb HM-model 1210 (manufactured by MOUNTECH Co.) by the single point BET method using nitrogen adsorption. Note that, in the measurement of the BET specific surface area, degassing conditions before the measurement are 60° C. and 10 minutes.

In the present invention, the BET specific surface area of the silver powder is 0.1 m$^2$/g or more but 2.0 m$^2$/g or less, preferably 0.3 m$^2$/g or more but 1.5 m$^2$/g or less. When the BET specific surface area is less than 0.1 m$^2$/g, the size of the silver powder is large and the silver powder is not suitable for drawing of fine wired lines in some cases. When the BET specific surface area is more than 2.0 m$^2$/g, the viscosity of a conductive paste obtained is too high and the conductive paste needs to be diluted before use. As a result, the concentration of silver in the conductive paste becomes low and the resultant wired lines may be broken.

The ratio of the Casson yield value of the conductive paste to the BET specific surface area of the silver powder (Casson yield value/BET specific surface area) is 500 or less.

When the ratio (Casson yield value/BET specific surface area) is 500 or less, it is possible to obtain a conductive paste having a good levelling property.

<Silver Powder>
As described below in detail regarding a method for producing a silver powder, preferably, the silver powder is produced by a wet reduction method and contains the organic substance on the surface of the silver powder, the organic substance containing at least one carboxyl group and at least one hydroxyl group in one molecule of the organic substance.

Here, what is meant by the wording "contains an organic substance on a surface of the silver powder, the organic substance containing at least one carboxyl group and at least one hydroxyl group in one molecule of the organic substance" includes states where the organic substance is attached on the surface of the silver powder in any way such as adsorption and coating. The silver powder may contain the organic substance on at least part of the surface of the silver powder. In other words, the entirety of the surface of the silver powder may contain the organic substance or part of the surface of the silver powder may contain the organic substance. Note that, the silver powder may contain the organic substance in an inner part of the silver powder.

(Method for Producing Silver Powder)

A method of the present invention for producing a silver powder is reducing and depositing a silver powder with a reducing agent by a wet reduction method and then adding an organic substance as a dispersion agent, the organic substance containing at least one carboxyl group and at least one hydroxyl group in one molecule of the organic substance. The method of the present invention preferably includes: a liquid preparation step of a silver ion dispersion liquid; a reduction step of silver; an adsorption step of a dispersion agent; a washing step of a silver powder; and a drying step of the silver powder. The method of the present invention further includes other steps, if necessary.

—Liquid Preparation Step of Silver Ion Dispersion Liquid—

The liquid preparation step of the silver ion dispersion liquid is a step of preparing a silver ion dispersion liquid.

As an aqueous reaction system containing silver ions, an aqueous solution or slurry containing silver nitrate, a silver complex, or a silver intermediate can be used.

The aqueous solution containing the silver complex can be formed by adding aqueous ammonia or an ammonium salt to an aqueous silver nitrate solution or a silver oxide suspension. Among them, use of an aqueous silver amine complex solution obtained by adding aqueous ammonia to an aqueous silver nitrate solution is preferable in order to allow the silver powder to have an appropriate particle diameter and a spherical shape.

The coordination number of ammonia in the silver amine complex is 2 and thus 2 mol or more of ammonia is added per 1 mol of silver. When the amount of ammonia is too large, the resultant complex becomes so stable that reduction does not proceed easily. Therefore, the amount of ammonia is preferably 8 mol or less per 1 mol of silver. Note that, even if the amount of ammonia exceeds 8 mol, it is still possible to obtain a spherical silver powder having an appropriate particle diameter by adjustments such as increasing the amount of the reducing agent added. Also, a pH adjuster may be added to the aqueous solution containing the silver ions. As the pH adjuster, commonly used acids and bases can be used. Examples thereof include nitric acid and sodium hydroxide.

—Reduction Step of Silver—

The reduction step of silver is a step of reducing and depositing silver with a reducing agent.

Examples of the reducing agent include ascorbic acid, sulfites, alkanolamine, aqueous hydrogen peroxide, formic acid, ammonium formate, sodium formate, glyoxal, tartaric acid, sodium hypophosphite, sodium borohydride, hydroquinone, hydrazine, hydrazine compounds, pyrogallol, glucose, gallic acid, formalin, anhydyous sodium sulphite, and Rongalite. These may be used alone or in combination.

Among them, at least one selected from the group consisting of ascorbic acid, alkanolamine, sodium borohydride, hydroquinone, hydrazine, and formalin is preferable, and hydrazine and formalin are particularly preferable.

Use of the reducing agent makes it possible to obtain a silver powder having an appropriate particle diameter. An amount of the reducing agent is preferably 1 equivalent or more relative to silver in order to increase the reaction yield of silver. When a reducing agent having weak reducing force is used, an amount of the reducing agent is preferably 2 equivalents or more, more preferably 10 equivalents or more but 20 equivalents or less, relative to silver.

A method of adding the reducing agent is preferably adding it at a speed of 1 equivalent/minute or higher in order to prevent aggregation of the silver powder. Although there is not a clear reason for this, one conceivable reason is as follows. Specifically, when the reducing agent is added in a short time, reduction and deposition of a silver powder occur at once. As a result, the reducing reaction is completed in a short time and aggregation between the formed nuclei does not easily occur to lead to improvement in dispersibility. Therefore, the addition time of the reducing agent is preferably shorter. For example, the reducing agent may be added at a speed of 100 equivalents/minute or higher. Also, it is preferable to stir the reaction mixture upon reduction so as to complete the reaction in a shorter time. Further, the liquid temperature upon the reducing reaction is preferably 5° C. or higher but 80° C. or lower, more preferably 15° C. or higher but 40° C. or lower.

The obtained silver powder is not particularly limited and may be appropriately selected depending on the intended purpose. It is preferably a spherical or amorphous silver powder. Here, the spherical silver powder refers to a silver powder which has a spherical or substantially spherical particle shape when observed under a scanning electron microscope (SEM) and in which 100 particles have a sphericity of 1.5 or less [where the sphericity is (the diameter of a part having the longest diameter)/(the diameter of a part having the shortest diameter) when the particles are observed in a SEM image]. The amorphous silver powder refers to a silver powder which has particle shapes other than the spherical particle shape when observed under a SEM and which does not have any features of specific particle shapes such as a columnar shape and a prismatic shape.

—Adsorption Step of Dispersion Agent—

The adsorption step of the dispersion agent is a step of adsorbing a dispersion agent onto the surface of the silver powder.

As the dispersion agent, an organic substance containing at least one carboxyl group and at least one hydroxyl group in one molecule of the organic substance is used.

By adding the dispersion agent to the liquid after reduction and deposition of the silver powder, it is possible to adsorb the dispersion agent onto the surface of the silver powder.

The organic substance is preferably a fatty acid containing at least one carboxyl group and at least one hydroxyl group in one molecule of the fatty acid, each of the groups is bonded to a chain hydrocarbon group. The organic substance is more preferably a fatty acid containing at least one hydroxyl group (hereinafter may be referred to as a hydroxyl fatty acid). By containing the hydroxyl group and making the surface of the silver powder slightly hydrophilic, it is possible to make the silver powder more compatible with a solvent. However, when the surface of the silver powder is made too hydrophilic, the silver powder becomes poor in compatibility conversely. Thus, the number of hydroxyl groups in one molecule is preferably 1 or more but 5 or less, more preferably 1 or more but 3 or less.

The number of carbon atoms of the fatty acid is preferably 6 or more but 20 or less, more preferably 12 or more but 20 or less. When the number of carbon atoms thereof is less than 6, the fatty acid may aggregate due to no occurrence of steric hindrance. When the number of carbon atoms thereof is more than 20, a dispersion agent does not decompose upon burning, potentially leading to deterioration in conductivity.

In view of a balance between adsorptivity onto the silver powder and releasability from the silver powder, the fatty acid is preferably a monovalent fatty acid containing one carboxyl group and at least one hydroxyl group in one molecule of the fatty acid.

Examples of the hydroxyl fatty acid containing one carboxyl group and at least one hydroxyl group in one molecule of the hydroxyl fatty acid include ricinoleic acid, 12-hydroxystearic acid, and aleuritic acid. These may be used alone or in combination. The ricinoleic acid and the 12-hydroxystearic acid are those in which one hydrogen of the carbon chain of a fatty acid has been substituted with a hydroxyl group. The number of carbon atoms of the fatty acid is 18 in both ricinoleic acid and hydroxystearic acid. Also, like the aleuritic acid in which three hydrogens of the carbon chain of a fatty acid containing a carboxyl group have been substituted with hydroxyl groups, a dispersion agent in which the number of hydroxyl groups substituting is two or more is suitable for reduction in thixotropic ratio.

Note that, usable methods for identifying the dispersion agent include: a method of measuring through FT-IR; a method of extracting a surface treatment agent with a solvent and measuring the extract with a carbon automatic analyzer or through GC-MS; and a method of heating the silver powder with, for example, a pyrolyzer and measuring the dispersion agent released from the silver powder surface with a carbon automatic analyzer or through GC-MS.

[Ricinoleic Acid]

The ricinoleic acid is an unsaturated fatty acid expressed by the following structural formula and is naturally present in a seed of *Ricinus communis*. Note that, about 90% of the constituting fatty acids of castor oil is a triglyceride of ricinoleic acid.

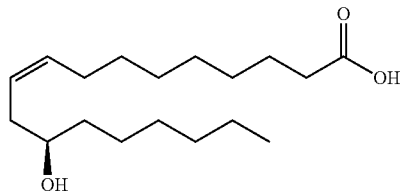 [SMILES: CCCCCC[C@@H](O)C/C=C\CCCCCCCC(=O)O]

[12-Hydroxystearic Acid]

The 12-hydroxystearic acid is a saturated fatty acid expressed by the following structural formula.

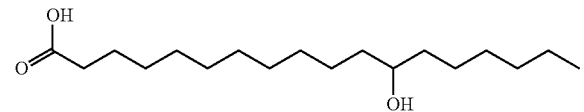 [SMILES: CCCCCCC(O)CCCCCCCCCCC(=O)O]

[Aleuritic Acid]

The aleuritic acid is a saturated fatty acid expressed by the following structural formula.

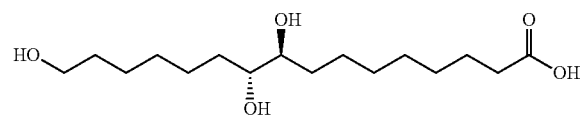 [SMILES: O=C(O)CCCCCCC[C@H](O)[C@H](O)CCCCCCO]

An amount of the organic substance attached is preferably 3.0% by mass or less, more preferably 1.0% by mass or less, relative to the mass of the silver powder.

An amount of the organic substance added in the adsorption step of the dispersion agent is preferably 3.0% by mass or less, more preferably 1.0% by mass or less, relative to the mass of the silver powder.

—Recovering and Washing Step of Silver Powder—

The recovering and washing step of the silver powder is a step of recovering and washing the obtained silver powder.

It is necessary to wash the silver powder obtained after the reduction step because the silver powder contains impurities.

A suitable washing solvent used for the washing is pure water. A manner of the recovering and washing is not particularly limited and may be appropriately selected depending on the intended purpose. Examples thereof include decantation and filter press. The end point of the washing can be judged based on electrical conductivity of water after washing. It is suitable to perform washing until the electrical conductivity reaches 0.5 mS/m or lower.

—Drying Step of Silver Powder—

The drying step of the silver powder is a step of drying the silver powder after the washing.

The silver powder after the washing contains much moisture and the moisture is needed to be removed before use. A suitable method for removing the moisture is drying in vacuum. The drying temperature is suitably set to 100° C. or lower. It is not preferable to apply excessive heat because sintering between silver powder particles occurs at the time of drying.

The obtained silver powder may be subjected to a dry-crushing treatment or a classification treatment. Instead of the crushing treatment, a surface flattening treatment may be performed. In the surface flattening treatment, the silver powder is charged into an apparatus capable of mechanically fluidizing the silver powder, and particles of the silver powder are allowed to mechanically crush with each other to flatten irregularities and angular parts on the surface of the silver powder. Also, a classification treatment may be performed after the crushing or the surface flattening treatment. Note that, drying, pulverizing, and classifying can be performed using an integrated apparatus capable of performing drying, pulverizing, and classifying (e.g., DRYMEISTER and MICRON DRYER manufacture by HOSOKAWA MICRON CORPORATION).

The following properties are seen in the silver powder produced by the method for producing a silver powder and including an organic substance on a surface of the silver powder, the organic substance containing at least one carboxyl group and at least one hydroxyl group in one molecule of the organic substance.

—Particle Size Distribution of Silver Powder—

A cumulative 50% point of particle diameter (Dm) of the silver powder in a volume-based particle size distribution of the silver powder as measured by a laser diffraction particle size distribution analysis is preferably 0.1 μm or more but 6.0 μm or less, more preferably 0.1 μm or more but 4.0 μm or less.

A ratio of $[(D_{90}-D_{10})/D_{50}]$ is preferably 3.0 or less, more preferably 2.0 or less, where $D_{50}$ is the cumulative 50% point of particle diameter, $D_{90}$ is a cumulative 90% point of particle diameter of the silver powder, and $D_{10}$ is a cumulative 10% point of particle diameter of the silver powder.

Similar to the BET specific surface area, when the particle size distribution of the silver powder is too large, the silver powder is not suitable for drawing of fine wired lines. When the particle size distribution of the silver powder is too small, it becomes difficult to increase the concentration of silver in the conductive paste. Also, the silver powder is preferably one where the peak width of the particle size distribution is narrow and the particle diameter is varied to a small extent; i.e., uniform.

The measurement of the particle size distribution of the silver powder can be performed through particle size distribution measurement based on a wet laser diffraction system. The particle size distribution measurement based on a wet laser diffraction system is as follows. Specifically, 0.1 g of silver powder is added to 40 mL of isopropyl alcohol and is dispersed for 2 minutes with a ultrasonic homogenizer (MODEL US-150T, manufactured by NISSEI Corporation). Next, the particle size distribution of the silver powder in the dispersion liquid is measured using a Microtrac particle size distribution analyzer (manufactured by NIKKISO CO., LTD., Microtrac MT3300EXII). The measurement results are plotted to create a graph, where frequency and cumulation of the particle size distribution of the silver powder are determined. A cumulative 10% point of particle diameter is described as $D_{10}$, a cumulative 50% point of particle diameter is described as $D_{50}$, and a cumulative 90% point of particle diameter is described as $D_{90}$.

(Conductive Paste)

In a first aspect, the conductive paste of the present invention contains the silver powder of the present invention, preferably contains the silver powder, a glass frit, a resin, and a solvent. The conductive paste further contains other ingredients, if necessary.

In a second aspect, the conductive paste of the present invention contains: a silver powder containing an organic substance on a surface of the silver powder, the organic substance containing at least one carboxyl group and at least one hydroxyl group in one molecule of the organic substance; a glass frit; a resin; and a solvent, wherein a ratio of (Casson yield value/BET specific surface area) is 500 or less, where the Casson yield value is a Casson yield value of the conductive paste and the BET specific surface area is a BET specific surface area of the silver powder.

<Silver Powder>

The silver powder used is the silver powder of the present invention.

An amount of the silver powder is not particularly limited and may be appropriately selected depending on the intended purpose. The amount of the silver powder is preferably 40% by mass or more but 90% by mass or less relative to the total amount of the conductive paste.

<Glass Frit>

The glass frit is an ingredient for bonding the silver powder to a substrate, when burned.

The glass frit is not particularly limited and may be appropriately selected depending on the intended purpose. Examples thereof include a bismuth borosilicate-based glass frit, an alkali metal borosilicate-based glass frit, an alkaline earth metal borosilicate-based glass frit, a zinc borosilicate-based glass frit, a lead borosilicate-based glass frit, a lead borate-based glass frit, and a lead silicate-based glass frit. These may be used alone or in combination. Note that, the glass frit is preferably a glass frit free from lead in view of an adverse influence of lead to the environment.

A softening point of the glass frit is not particularly limited and may be appropriately selected depending on the intended purpose. The softening point of the glass frit is preferably 400° C. or higher but 600° C. or lower. When the softening point is lower than 400° C., sintering of the glass starts before the resin component in the conductive paste is evaporated, and thus a debinder process does not proceed smoothly. As a result, the resin component becomes carbon residues after burning, which may cause peeling of a conductive film. When the softening point is higher than 600° C., a fine conductive film having a sufficient adhesion strength may not be obtained, if burning is performed at a temperature equal to or lower than about 600° C.

The softening point can be determined from the temperature of the bottom width of the second endothermic portion of a DTA curve measured by, for example, a thermogravimetric analyzer.

An amount of the glass fit is not particularly limited and may be appropriately selected depending on the intended purpose. The amount of the glass fit is preferably 0.1% by mass or more but 10% by mass or less relative to the silver powder.

<Resin>

The resin is not particularly limited and may be appropriately selected depending on the intended purpose. Examples thereof include an epoxy resin, an acrylic resin, a polyester resin, a polyimide resin, a polyurethane resin, a phenoxy resin, a silicone resin, and ethyl cellulose. These may be used alone or in combination.

An amount of the resin is not particularly limited and may be appropriately selected depending on the intended purpose.

The solvent is not particularly limited and may be appropriately selected depending on the intended purpose. Examples thereof include terpineol, butyl carbitol, butyl carbitol acetate, and texanol. These may be used alone or in combination.

The other ingredients are not particularly limited and may be appropriately selected depending on the intended purpose. Examples thereof include a metal oxide such as zinc oxide and a viscosity adjuster.

<Method for Producing Conductive Paste>

A method used in the present invention for producing a conductive paste is the method of the present invention for producing a conductive paste.

It is preferable to knead the silver powder of the present invention, the glass frit, the resin, the solvent, and the other ingredients contained if necessary, with a planetary centrifugal stirrer and bubble remover and dispersing with a triple roll mill.

A specific paste composition is presented below and a flowchart of a preparation flow of the conductive paste is depicted in FIG. 1.

<Paste Composition>

TABLE 1

| Silver powder | 86.0% by mass |
|---|---|
| Glass frit | 1.0% by mass |
| Zinc oxide | 1.9% by mass |
| Ethyl cellulose | 0.6% by mass |
| Texanol | 10.5% by mass |

The conductive paste of the present invention can be printed on a substrate by, for example, screen printing, offset printing, or photolithography. In the case of the screen printing, the viscosity of the conductive paste is preferably 10 Pa·s or more but 1,000 Pa·s or less at 25° C. and 1 rotation. When the viscosity of the conductive paste is less than 10 Pa·s, "bleeding" may occur upon printing. When the viscosity of the conductive paste is more than 1,000 Pa·s, printing unevenness such as "blurred print" may occur.

The viscosity of the conductive paste can be adjusted by adjusting the amount of the silver powder, adding a viscosity adjuster, and changing the kind of the solvent.

The conductive paste is suitably used as a photosensitive paste and can be printed on a substrate by, for example, screen printing, offset printing, or photolithography.

The conductive paste of the present invention is suitably used in, for example, electrodes and circuits of various electronic parts, such as solar cells, chip parts, hybrid ICs, defoggers, thermistors, varistors, thermal heads, liquid crystal displays (LCDs), plasma displays (PDPs), field emission displays (FEDs), and electromagnetic shielding materials.

EXAMPLES

The present invention will next be described by way of Examples and Comparative Examples. The present invention, however, should not be construed as being limited to these Examples and Comparative Examples.

Note that, identification of the organic substance of each silver powder prepared in Examples and Comparative Examples, and measurements of the BET specific surface area and the particle size distribution were performed in the following manners.

<Identification of Organic Substance>

Each of the prepared silver powders was heated at 300° C. using a pyrolyzer (EGA/Py-3030D, manufactured by Frontier Lab Co.) to release the organic substance from the surface of the silver powder. Then, the released organic substance was identified using GC-MS (7890A/5975C, manufactured by Agilent Technologies Co.).

Here, a fatty acid containing a hydroxyl group has high polarity and is very low in sensitivity in the above method. Thus, it is necessary to methylate the functional group. A method in this case will be described below.

1 mL of a mixture of hydrochloric acid and methanol (Hydrogen Chloride-Methanol Reagent, manufactured by TOKYO CHEMICAL INDUSTRY CO., LTD.) was added to 0.5 g of the silver powder. The mixture was heated at 50° C. for 30 minutes to release the organic substance from the surface of the silver powder and methylate the functional group, and then was left to cool. Then, 1 mL of pure water and 2 mL of n-hexane were added to the mixture, followed by shaking, to extract the methylated organic substance into the hexane layer. The hexane layer was analyzed for ingredients using the GC-MS, to thereby identify the organic substance on the surface of the silver powder. Hereinafter, the organic substance whose functional group was methylated will be described as a derivative of the organic substance.

<BET Specific Surface Area>

The BET specific surface area of each of the prepared silver powders was measured with a BET specific surface area measuring device (Macsorb HM-model 1210, manufactured by MOUNTECH Co.) by the single point BET method using nitrogen adsorption. Note that, in the measurement of the BET specific surface area, degassing conditions before the measurement were 60° C. and 10 minutes.

<Particle Size Distribution>

The particle size distribution of each of the prepared silver powders was measured in the following manner. Specifically, 0.1 g of the silver powder was added to 40 mL of isopropyl alcohol and was dispersed for 2 minutes with a ultrasonic homogenizer (MODEL US-150T, manufactured by NISSEI Corporation), followed by measurement using a Microtrac particle size distribution analyzer (Microtrac MT3300EXII, manufactured by NIKKISO CO., LTD.). The measurement results were plotted to create a graph, where frequency and cumulation of the particle size distribution of the silver powder were determined to measure a cumulative 10% point of particle diameter ($D_{10}$), a cumulative 50% point of particle diameter ($D_{50}$), and a cumulative 90% point of particle diameter ($D_{90}$).

Example 1

—Preparation of Silver Powder—

3,600 g of a silver nitrate solution containing 52 g of silver was provided. 160 g of a 28% by mass aqueous ammonia solution was added to the silver nitrate solution to prepare an aqueous reaction system containing silver ions. The liquid temperature was set to 25° C.

13 g of an 80% by mass aqueous hydrazine solution was added as a reducing agent to the aqueous reaction system containing silver ions, followed by thoroughly stirring, to thereby obtain a slurry containing a silver powder.

Next, 5.9 g of an ethanol solution containing 3.5% by mass ricinoleic acid (which is the same as oleic acid except for addition of one hydroxyl group; the number of carbon atoms: 18) was added as a dispersion agent to the obtained slurry containing the silver powder, followed by thoroughly stirring and then aging. The amount of ricinoleic acid is 0.4% by mass relative to the mass of the silver powder. The aged slurry was filtrated, washed with water, and crushed, to thereby obtain a silver powder of Example 1.

As a result of evaluating the obtained silver powder, the BET specific surface area was 1.42 $m^2/g$, the cumulative 10% point of particle diameter ($D_{10}$) was 0.9 µm, the cumulative 50% point of particle diameter ($D_{50}$) was 1.7 µm, the cumulative 90% point of particle diameter ($D_{90}$) was 3.4 µm, and the ratio of $[(D_{90}-D_{10})/D_{50}]$ was (3.4−0.9)/1.7=1.5. Also, as a result of analyzing the organic substance attached to the silver powder according to the above method, a peak attributed to a derivative of ricinoleic acid was observed and thus it could be confirmed that ricinoleic acid was present on the surface of the silver powder.

—Preparation of Conductive Paste—

0.3 g of a glass frit (manufactured by OKUNO CHEMICAL INDUSTRIES CO., LTD., G3-5754), 0.6 g of zinc oxide (manufactured by Junsei Chemical Co., Ltd., special grade reagent), 0.2 g of ethyl cellulose 100 cp (manufactured by Wako Pure Chemical Industries, Ltd.), and 3.3 g of texanol (manufactured by JNC Corporation, CS-12) were added to 27 g of the obtained silver powder, followed by mixing using propeller-less planetary centrifugal stirrer and bubble remover (manufactured by THINKY Corporation, AR-250). Thereafter, a triple roll mill (manufactured by EXAKT Co., EXAKT80S) was used to allow the mixture to pass through a gradually narrowing roll gap, to thereby obtain a conductive paste.

The obtained conductive paste was measured for viscosity with a number of rotation of the cone being 0.1 rpm, 1.0 rpm, 5.0 rpm, or 10.0 rpm. The viscosity was measured at 25° C. using cone: CP52 in viscometer 5XHBDV-IIIUC manufactured by BROOKFIELD Co.

The shear velocity at 0.1 rpm was 0.2 rad/s and the viscosity was 2,010 Pa·s. The shear velocity at 1.0 rpm was 2.0 rad/s and the viscosity was 396 Pa·s. The shear velocity at 5.0 rpm was 10.0 rad/s and the viscosity was 113 Pa·s. The shear velocity at 10.0 rpm was 20.0 rad/s and the viscosity was 62 Pa·s.

When shear stress ti was determined from the above values, the shear stress τ was 402 Pa, 792 Pa, 1,130 Pa, and 1,240 Pa.

By plotting $\sqrt{D}$ and $\sqrt{\tau}$ on a scatter chart, the formula $\sqrt{\tau}=3.6\times\sqrt{D}+20.7$ was obtained. The Casson yield value was 429, with "Casson yield value/BET specific surface area"=429/1.42=302.

The obtained conductive paste was printed using a screen printing machine. When visually observed, the resultant conductive film was free from irregularities, indicating a good levelling property.

Example 2

—Preparation of Silver Powder—

In the same manner as in Example 1 except that the dispersion agent was changed to 5.9 g of an ethanol solution containing 3.5% by mass 12-hydroxystearic acid (which is the same as stearic acid except for addition of one hydroxyl group; the number of carbon atoms: 18), a silver powder was aged. The amount of 12-hydroxystearic acid is 0.4% by mass relative to the mass of the silver powder. The aged silver powder slurry was filtrated, washed with water, and crushed, to thereby obtain a silver powder of Example 2.

As a result of evaluating the obtained silver powder, the BET specific surface area was 1.31 m$^2$/g, the cumulative 10% point of particle diameter ($D_{10}$) was 0.7 µm, the cumulative 50% point of particle diameter ($D_{50}$) was 1.5 µm, the cumulative 90% point of particle diameter ($D_{90}$) was 3.1 µm, and the ratio of $[(D_{90}-D_{10})/D_{50}]$ was (3.1−0.7)/1.5=1.6. Also, as a result of analyzing the organic substance attached to the silver powder according to the above method, a peak attributed to a derivative of 12-hydroxystearic acid was observed and thus it could be confirmed that 12-hydroxystearic acid was present on the surface of the silver powder.

—Preparation of Conductive Paste—

The obtained silver powder was used in the same manner as in Example 1 to obtain a conductive paste of Example 2.

The obtained conductive paste was determined for Casson yield value in the same manner as in Example 1 and the Casson yield value was 450, with "Casson yield value/BET specific surface area"=450/1.31=344.

The obtained conductive paste was printed using a screen printing machine. When visually observed, the resultant conductive film was free from irregularities, indicating a good levelling property.

Example 3

—Preparation of Silver Powder—

3,700 g of a silver nitrate solution containing 52 g of silver was provided. 150 g of a 28% by mass aqueous ammonia solution was added to the silver nitrate solution to prepare an aqueous reaction system containing silver ions. The liquid temperature was set to 28° C. 240 g of a 37% by mass aqueous formalin solution was added as a reducing agent to the aqueous reaction system containing silver ions, followed by thoroughly stirring, to thereby obtain a slurry containing a silver powder.

4.7 g of an ethanol solution containing 2.0% by mass aleuritic acid (which is the same as stearic acid except for addition of three hydroxyl groups; the number of carbon atoms: 18) was added as a dispersion agent to the obtained slurry containing the silver powder, followed by thoroughly stirring and then aging. The amount of aleuritic acid is 0.18% by mass relative to the mass of the silver powder. The aged slurry was filtrated, washed with water, and crushed, to thereby obtain a silver powder of Example 3.

As a result of evaluating the obtained silver powder, the BET specific surface area was 0.46 m$^2$/g, the cumulative 10% point of particle diameter ($D_{10}$) was 1.6 µm, the cumulative 50% point of particle diameter ($D_{50}$) was 3.0 µm, the cumulative 90% point of particle diameter ($D_{90}$) was 5.5 µm, and the ratio of $[(D_{90}-D_{10})/D_{50}]$ was (5.5−1.6)/3.0=1.3. Also, as a result of analyzing the organic substance attached to the silver powder according to the above method, a peak attributed to a derivative of aleuritic acid was observed and thus it could be confirmed that aleuritic acid was present on the surface of the silver powder.

—Preparation of Conductive Paste—

The obtained silver powder was used in the same manner as in Example 1 to obtain a conductive paste of Example 3.

The obtained conductive paste was determined for Casson yield value in the same manner as in Example 1 and the Casson yield value was 17, with "Casson yield value/BET specific surface area"=17/0.46=37.

The obtained conductive paste was printed using a screen printing machine. When visually observed, the resultant conductive film was free from irregularities, indicating a good levelling property.

Example 4

—Preparation of Silver Powder—

In the same manner as in Example 3 except that the dispersion agent was changed to 4.7 g of an ethanol solution containing 2.0% by mass 12-hydroxystearic acid (which is the same as stearic acid except for addition of one hydroxyl group; the number of carbon atoms: 18), a silver powder was aged. The amount of 12-hydroxystearic acid is 0.18% by mass relative to the mass of the silver powder. The aged slurry was filtrated, washed with water, and crushed, to thereby obtain a silver powder of Example 4.

As a result of evaluating the obtained silver powder, the BET specific surface area was 0.42 m$^2$/g, the cumulative 10% point of particle diameter ($D_{10}$) was 1.4 µm, the cumulative 50% point of particle diameter ($D_{50}$) was 2.7 µm, the cumulative 90% point of particle diameter ($D_{90}$) was 5.2 µm, and the ratio of $[(D_{90}-D_{10})/D_{50}]$ was (5.2−1.4)/2.7=1.4. Also, as a result of analyzing the organic substance attached to the silver powder according to the above method, a peak attributed to a derivative of 12-hydroxystearic acid was observed and thus it could be confirmed that 12-hydroxystearic acid was present on the surface of the silver powder.

—Preparation of Conductive Paste—

The obtained silver powder was used in the same manner as in Example 1 to obtain a conductive paste of Example 4.

The obtained conductive paste was determined for Casson yield value in the same manner as in Example 1 and the Casson yield value was 204, with "Casson yield value/BET specific surface area"=204/0.42=486.

The obtained conductive paste was printed using a screen printing machine. When visually observed, the resultant conductive film was free from irregularities, indicating a good levelling property.

Comparative Example 1

—Preparation of Silver Powder—

In the same manner as in Example 1 except that the dispersion agent was changed to 5.9 g of an ethanol solution containing 3.5% by mass stearic acid, a silver powder was aged. The amount of stearic acid is 0.4% by mass relative to the mass of the silver powder. The aged slurry was filtrated, washed with water, and crushed, to thereby obtain a silver powder of Comparative Example 1.

As a result of evaluating the obtained silver powder, the BET specific surface area was 1.27 m$^2$/g, the cumulative 10% point of particle diameter ($D_{10}$) was 0.5 μm, the cumulative 50% point of particle diameter ($D_{50}$) was 1.5 μm, the cumulative 90% point of particle diameter ($D_{90}$) was 3.1 μm, and the ratio of $[(D_{90}-D_{10})/D_{50}]$ was (3.1−0.5)/1.5=1.7. Also, as a result of analyzing the organic substance attached to the silver powder according to the above method, a peak attributed to stearic acid was observed and thus it could be confirmed that stearic acid was present on the surface of the silver powder.

—Preparation of Conductive Paste—

The obtained silver powder was used in the same manner as in Example 1 to obtain a conductive paste of Comparative Example 1.

The obtained conductive paste was determined for Casson yield value in the same manner as in Example 1 and the Casson yield value was 701, with "Casson yield value/BET specific surface area"=701/1.27=552.

The obtained conductive paste was printed using a screen printing machine. When visually observed, the resultant conductive film had irregularities, indicating a poor levelling property.

Comparative Example 2

—Preparation of Silver Powder—

In the same manner as in Example 3 except that the dispersion agent was changed to 4.7 g of an ethanol solution containing 2.0% by mass oleic acid, a silver powder was aged. The amount of oleic acid is 0.18% by mass relative to the mass of the silver powder. The aged slurry was filtrated, washed with water, and crushed, to thereby obtain a silver powder of Comparative Example 2.

As a result of evaluating the obtained silver powder, the BET specific surface area was 0.39 m$^2$/g, the cumulative 10% point of particle diameter ($D_{10}$) was 1.6 μm, the cumulative 50% point of particle diameter ($D_{50}$) was 3.1 μm, the cumulative 90% point of particle diameter ($D_{90}$) was 6.2 μm, and the ratio of $[(D_{90}-D_{10})/D_{50}]$ was (6.2−1.6)/3.1=1.5. Also, as a result of analyzing the organic substance attached to the silver powder according to the above method, a peak attributed to oleic acid was observed and thus it could be confirmed that oleic acid was present on the surface of the silver powder.

—Preparation of Conductive Paste—

The obtained silver powder was used in the same manner as in Example 1 to obtain a conductive paste of Comparative Example 2.

The obtained conductive paste was determined for Casson yield value in the same manner as in Example 1 and the Casson yield value was 304, with "Casson yield value/BET specific surface area"=304/0.39=780.

The obtained conductive paste was printed using a screen printing machine. When visually observed, the resultant conductive film had irregularities, indicating a poor levelling property. In addition, the lines were observed to be broken in several places.

Table 3 presents the BET specific surface area, the Casson yield value, and the value of Casson yield value/BET specific surface area in the above Examples and the Comparative Examples.

TABLE 3

| | Dispersion agent | Amount (% by mass) | BET specific surface area (B) m$^2$/g | Casson yield value (A) | (A)/(B) |
|---|---|---|---|---|---|
| Ex. 1 | ricinoleic acid | 0.4 | 1.42 | 429 | 302 |
| Ex. 2 | 12-hydroxy stearic acid | 0.4 | 1.31 | 450 | 344 |
| Ex. 3 | aleuritic acid | 0.18 | 0.46 | 17 | 37 |
| Ex. 4 | 12-hydroxy stearic acid | 0.18 | 0.42 | 204 | 486 |
| Comp. Ex. 1 | stearic acid | 0.4 | 1.27 | 701 | 552 |
| Comp. Ex. 2 | oleic acid | 0.18 | 0.39 | 304 | 780 |

Comparison between the Examples and the Comparative Examples indicates that it is possible to provide a conductive paste excellent in levelling property by using the silver powder where "Casson yield value/BET specific surface area" was 500 or less.

INDUSTRIAL APPLICABILITY

The conductive paste containing the silver powder of the present invention has a good levelling property and thus can be suitably used for formation of electrodes and circuits of various electronic parts.

The invention claimed is:

1. A silver powder, comprising:
an organic substance on a surface of the silver powder, the organic substance containing at least one carboxyl group and at least one hydroxyl group in one molecule of the organic substance,
wherein a ratio of Casson yield value (Pa) to BET specific surface area (m$^2$/g) is 500 Pa·g/m$^2$ or less, where the Casson yield value is a Casson yield value of a conductive paste and the BET specific surface area is a BET specific surface area of the silver powder, where the conductive paste has a composition in which the silver powder is 86% by mass, a glass frit is 1% by mass, ethyl cellulose is 0.6% by mass, texanol is 10.5% by mass, and zinc oxide is 1.9% by mass, and the conductive paste is prepared by kneading the composition with a planetary centrifugal stirrer and bubble remover and dispersing with a triple roll mill.

2. The silver powder according to claim 1, wherein the organic substance is a fatty acid containing at least one hydroxyl group in one molecule of the fatty acid.

3. The silver powder according to claim 2, wherein the number of carbon atoms in one molecule of the fatty acid is 6 or more but 20 or less.

4. The silver powder according to claim 2, wherein the fatty acid is at least one selected from the group consisting of ricinoleic acid, 12-hydroxystearic acid, and aleuritic acid.

5. The silver powder according to claim 1, wherein the BET specific surface area of the silver powder is 0.1 m$^2$/g or more but 2.0 m$^2$/g or less and wherein a cumulative 50% point of particle diameter ($D_{50}$) of the silver powder in a volume-based particle size distribution of the silver powder as measured by a laser diffraction particle size distribution analysis is 0.1 μm or more but 6.0 μm or less, and a ratio of $[(D_{90}-D_{10})/D_{50}]$ is 3.0 or less, where $D_{50}$ is the cumulative 50% point of particle diameter, $D_{90}$ is a cumulative 90% point of particle diameter of the silver powder, and $D_{10}$ is a cumulative 10% point of particle diameter of the silver powder.

6. A method for producing a silver powder, the method comprising:
   reducing an aqueous reaction system containing silver ions and depositing silver powder using a reducing agent by a wet reduction method;
   then adding an organic substance as a dispersion agent into a slurry containing the deposited silver powder, wherein the organic substance comprises at least one carboxyl group and at least one hydroxyl group in one molecule of the organic substance and
   recovering and washing the silver powder.

7. The method for producing a silver powder according to claim 6, wherein the reducing agent is at least one selected from the group consisting of ascorbic acid, alkanolamine, sodium borohydride, hydroquinone, hydrazine, and formalin.

8. A conductive paste, comprising:
   the silver powder according to claim 1.

9. The conductive paste according to claim 8, wherein the conductive paste is a photosensitive paste.

10. A conductive paste, comprising:
    a silver powder containing an organic substance on a surface of the silver powder, the organic substance containing at least one carboxyl group and at least one hydroxyl group in one molecule of the organic substance;
    a glass frit;
    a resin; and
    a solvent,
    wherein a ratio of Casson yield value (Pa) to BET specific surface area ($m^2/g$) is 500 $Pa \cdot g/m^2$ or less, where the Casson yield value is a Casson yield value of the conductive paste and the BET specific surface area is a BET specific surface area of the silver powder.

11. The conductive paste according to claim 10, wherein the organic substance is a fatty acid containing at least one hydroxyl group in one molecule of the fatty acid, and the number of carbon atoms in one molecule of the fatty acid is 6 or more but 20 or less.

12. The conductive paste according to claim 11, wherein the fatty acid is at least one selected from the group consisting of ricinoleic acid, 12-hydroxystearic acid, and aleuritic acid.

13. The conductive paste according claim 10, wherein the BET specific surface area of the silver powder is 0.1 $m^2/g$ or more but 2.0 $m^2/g$ or less and wherein a cumulative 50% point of particle diameter ($D_{50}$) of the silver powder in a volume-based particle size distribution of the silver powder as measured by a laser diffraction particle size distribution analysis is 0.1 μm or more but 6.0 μm or less, and a ratio of $[(D_{90}-D_{10})/D_{50}]$ is 3.0 or less, where $D_{50}$ is the cumulative 50% point of particle diameter, $D_{90}$ is a cumulative 90% point of particle diameter of the silver powder, and $D_{10}$ is a cumulative 10% point of particle diameter of the silver powder.

* * * * *